United States Patent
Kawai et al.

(10) Patent No.: US 9,085,215 B2
(45) Date of Patent: Jul. 21, 2015

(54) AIR-CONDITIONER REMOTE CONTROL SYSTEM FOR VEHICLE, SERVER, MOBILE TERMINAL, AND VEHICLE

(75) Inventors: Hirohito Kawai, Nagakute (JP); Naoya Inoue, Nagoya (JP); Seiichi Tsunoda, Nisshin (JP); Takaaki Goto, Seto (JP); Yoichiro Higuchi, Suzuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/118,349

(22) PCT Filed: May 18, 2011

(86) PCT No.: PCT/JP2011/061437
§ 371 (c)(1),
(2), (4) Date: Nov. 18, 2013

(87) PCT Pub. No.: WO2012/157095
PCT Pub. Date: Nov. 22, 2012

(65) Prior Publication Data
US 2014/0100716 A1    Apr. 10, 2014

(51) Int. Cl.
*B60H 1/00* (2006.01)
*B60L 1/00* (2006.01)
(Continued)

(52) U.S. Cl.
CPC ........ *B60H 1/00642* (2013.01); *B60H 1/00657* (2013.01); *B60L 1/003* (2013.01); *B60L 11/14* (2013.01); *B60L 11/1816* (2013.01);
(Continued)

(58) Field of Classification Search
CPC ........... B60H 1/00642; B60H 1/00807; B60H 1/00657; G07C 5/008
USPC ........................................................ 701/2, 36
See application file for complete search history.

(56) References Cited

U.S. PATENT DOCUMENTS 5,810,078 A * 9/1998 Knutsson et al. ............. 165/203
6,234,398 B1 * 5/2001 Pawlak et al. ................ 236/91 C
(Continued)

FOREIGN PATENT DOCUMENTS

EP    1953015 A1 * 8/2008 ............... B60H 1/00
JP    10006734 A  * 1/1998 ............... B60H 1/00
(Continued)

OTHER PUBLICATIONS

EPO machine translation of EP 1953015 (original EP document published Aug. 6, 2008).*
(Continued)

*Primary Examiner* — Behrang Badii
*Assistant Examiner* — David Testardi
(74) *Attorney, Agent, or Firm* — Oliff PLC (57) ABSTRACT

An estimated temperature range is calculated by adding a plus-side temperature width to the temperature detected by a temperature sensor within the cabin of a vehicle and subtracting a minus-side temperature width therefrom, and is displayed on the display of a mobile terminal as a temperature state of the cabin. When cooling is performed, the plus-side temperature width is made greater than the minus-side temperature width. Also, the plus-side temperature width is narrowed with elapse of time from the start of pre-air-conditioning. With this operation, the temperature state of the vehicle cabin from the start of the pre-air-conditioning can be properly communicated to a vehicle user.

10 Claims, 6 Drawing Sheets

(51) Int. Cl.
*B60L 11/14* (2006.01)
*B60L 11/18* (2006.01)
*G08C 17/02* (2006.01)

(52) U.S. Cl.
CPC ............ *G08C17/02* (2013.01); *B60H 1/00807* (2013.01); *B60L 2240/34* (2013.01); *B60L 2240/622* (2013.01); *B60L 2240/662* (2013.01); *B60L 2240/70* (2013.01); *B60L 2240/80* (2013.01); *B60L 2250/16* (2013.01); *B60L 2260/56* (2013.01); *G08C 2201/93* (2013.01); *Y02T 10/70* (2013.01); *Y02T 10/7005* (2013.01); *Y02T 10/7077* (2013.01); *Y02T 10/7291* (2013.01); *Y02T 90/14* (2013.01); *Y02T 90/16* (2013.01); *Y02T 90/162* (2013.01)

(56) References Cited

U.S. PATENT DOCUMENTS

| | | | |
|---|---|---|---|
| 6,709,155 | B2 * | 3/2004 | Knittel et al. .................. 374/141 |
| 7,055,340 | B2 * | 6/2006 | Umebayashi et al. .......... 62/244 |
| 2004/0194479 | A1 | 10/2004 | Umebayashi et al. |
| 2010/0235046 | A1 * | 9/2010 | Proefke et al. .................. 701/36 |
| 2011/0086668 | A1 * | 4/2011 | Patel ........................... 455/556.1 |
| 2011/0225279 | A1 * | 9/2011 | Kalhous et al. ................ 709/223 |
| 2012/0086395 | A1 * | 4/2012 | Kim et al. ...................... 320/109 |
| 2012/0101659 | A1 * | 4/2012 | Kim et al. ......................... 701/2 |
| 2012/0115446 | A1 * | 5/2012 | Gautama et al. ............ 455/414.1 |
| 2012/0116608 | A1 * | 5/2012 | Park et al. .......................... 701/2 |
| 2014/0081481 | A1 * | 3/2014 | Nishida .............................. 701/2 |

FOREIGN PATENT DOCUMENTS

| | | | | |
|---|---|---|---|---|
| JP | 2001235271 A * | 8/2001 | ............. | F25D 23/00 |
| JP | A-2002-264643 | 9/2002 | | |
| JP | A-2004-256092 | 9/2004 | | |
| JP | A-2005-112129 | 4/2005 | | |
| JP | 2005161885 A * | 6/2005 | ............... | B60H 1/00 |
| JP | 2006118220 A * | 5/2006 | | |
| JP | A-2009-89474 | 4/2009 | | |
| WO | WO 9936280 A1 * | 7/1999 | ............... | B60H 1/00 |

OTHER PUBLICATIONS

JPO machine translation of JP 2005-161885 (original JP document published Jun. 23, 2005).*
JPO machine translation of JP 2006-118220 (original JP document published May 11, 2006).*
Analog Devices brochure, "Voltage output temperature sensor with signal conditioning", AD22100, Rev. D, 2004, 12 pages.*
GE Measurements and Control Solutions brochure, "AIT active incar temperature sensor", 920-527A, 2010, 4 pages.*
Omega.com publication, "Tthermistor resistance vs temperature", 2009, 3 pages, downloaded from http://www.omega.com/temperature/z/pdf/z256-257.pdf.*
Vishay catalog, "NTC thermistors", Sep. 5, 2003, pp. 102-113.*

* cited by examiner

| T | x | y |
|---|---|---|
| 0~30sec | x1 | y1 |
| 30~60sec | x2 | y2 |
| 60~120sec | x3 | y3 |
| 120sec~ | x4 | y4 |

FIG.5

| T | x | y |
|---|---|---|
| 0~30sec | 15°C | 5°C |
| 30~60sec | 12°C | 5°C |
| 60~120sec | 8°C | 5°C |
| 120sec~ | 5°C | 5°C |

FIG.6

AIR-CONDITIONER REMOTE CONTROL SYSTEM FOR VEHICLE, SERVER, MOBILE TERMINAL, AND VEHICLE

TECHNICAL FIELD

The present invention relates to an air-condition remote control system which enables a vehicle user to start an air conditioner of a vehicle in advance before getting into the vehicle through remote control, to thereby perform pre-air-conditioning of the cabin of the vehicle.

BACKGROUND ART

Conventionally, there has been known an air-condition remote control system which enables a vehicle user to start an air conditioner of a vehicle in advance before getting into the vehicle through remote control, to thereby perform pre-air-conditioning of the vehicle cabin. For example, in a system proposed in Patent Document 1, an instruction for operating an air conditioner of a vehicle is transmitted from a cellular phone to an onboard monitor apparatus via a base station. Upon receipt of the operation instruction, the onboard monitor apparatus determines whether or not the voltage of an onboard battery is equal to or higher than a predetermined voltage at or above which the air conditioner can operate. When the voltage of the onboard battery is equal to or higher than the predetermined voltage, the onboard monitor apparatus operates the air conditioner. Subsequently, the onboard monitor apparatus provides the cellular phone with information representing whether or not the air conditioner has started its operation.

PRIOR ART DOCUMENT

Patent Document

Patent Document 1: Japanese Patent Application Laid-Open (kokai) No. 2005-112129

SUMMARY OF THE INVENTION

However, the system proposed in Patent Document 1 cannot enable the vehicle user to know the temperature within the cabin, although it enables the user to known that the air conditioner has started its operation. A conceivable measure for solving such a problem is displaying on a driver's cellular phone the cabin temperature detected by a cabin temperature sensor. However, the cabin temperature detected by the cabin temperature sensor differs from the actual temperature at the seating position of a vehicle occupant. In particular, in the case where the vehicle has been left in a high temperature environment for a long time, the actual temperature at the seating position of the vehicle occupant is considerably higher than the cabin temperature detected by the cabin temperature sensor. In other words, the cabin temperature detected by the cabin temperature sensor is considerably lower than the actual cabin temperature. Therefore, if the temperature detected by the sensor is displayed on the cellular phone, when the user of the vehicle gets into the vehicle, he or she has an uncomfortable feeling because of the difference between the displayed temperature and the temperature sensed by the vehicle user. In order to overcome such a drawback, displaying the detected temperature may be delayed until the temperature detected by the cabin temperature sensor approaches the actual temperature after start of air conditioning. However, in such a case, temperature information cannot be provided timely.

The present invention has been accomplished so as to solve the above-described problem, and its object is to properly inform a vehicle user of the temperature state of the cabin during pre-air-conditioning.

In order to achieve the above-described object, the present invention provides an air-condition remote control system for a vehicle which transmits a remote operation instruction from a mobile terminal (300) carried by a vehicle user to an onboard communication apparatus (150) of a vehicle identified by the mobile terminal, the transmission being performed via a server (210) provided at an information center (200) which handles vehicle information, whereby an air conditioner (180) of the vehicle is started before the user gets into the vehicle so as to perform pre-air conditioning of the cabin of the vehicle. The air-condition remote control system comprises:

temperature state estimation section (S31 to S41) which estimates a temperature state of the cabin; and display control section (S50) which displays the temperature state estimated by the temperature state estimation section on a screen of the mobile terminal in a display state which is associated with its estimation accuracy.

In the present invention, when the vehicle user sends an instruction of starting pre-air-conditioning by operating the mobile terminal, the start instruction is transmitted to the server. Upon receipt of the pre-air-conditioning start instruction from the mobile terminal, the server transmits to the onboard communication apparatus of the vehicle identified by the mobile terminal an instruction for requesting start of the air conditioner. Thus, the air conditioner is started.

During the pre-air-conditioning, the temperature state estimation section estimates the temperature state of the vehicle cabin. For example, the temperature state estimation section periodically obtains the cabin temperature detected by the cabin temperature sensor, and estimates the temperature state on the basis of the detected cabin temperature. The display control section displays the temperature state estimated by the temperature state estimation section on the screen of the mobile terminal in a display state which is associated with the estimation accuracy. The estimation accuracy represents the degree of uncertainty of the displayed temperature state. Thus, the vehicle user can know the estimated temperature state along with its estimation accuracy. Accordingly, even at the beginning of the pre-air-conditioning, at which detection of the actual cabin temperature is difficult, the gap between the temperature state displayed on the mobile terminal and the temperature sensed by the vehicle user can be reduced by means of displaying the temperature state in a display state corresponding to a lowered estimation accuracy. Thus, the uncomfortable feeling which the vehicle user has when he or she gets into the vehicle can be mitigated. Also, air conditioning temperature information can be timely provided to the vehicle user immediately after the start of the pre-air-conditioning. As a result, according to the present invention, the temperature state of the vehicle cabin during the pre-air-conditioning can be properly communicated to the vehicle user.

Another feature of the present invention resides in that the air-condition remote control system comprises estimation accuracy display changing section (S35 to S41) for changing the screen display of the mobile terminal such that the estimation accuracy increases with elapse of time after the start of the pre-air-conditioning.

When the pre-air-conditioning is started, the temperature distribution within the vehicle cabin becomes uniform because of circulation of air within the vehicle cabin, and the accuracy in estimating the temperature state of the vehicle cabin increases accordingly. In view of this, in the present invention, the estimation accuracy display changing section changes the screen display of the mobile terminal such that the estimation accuracy increases with elapse of time after the start of the pre-air-conditioning. As a result, according to the present invention, the temperature state of the vehicle cabin during the pre-air-conditioning can be more properly communicated to the vehicle user.

Another feature of the present invention resides in that the temperature state estimation section includes detected temperature acquisition part (S31) for periodically acquiring the cabin temperature (D) detected by a cabin temperature sensor (182); and temperature range estimation part (S36, S38, S40, S41) for estimating, as the temperature state, a cabin temperature range (At) determined on the basis of the cabin temperature acquired by the detected temperature acquisition part such that the cabin temperature range has a width (x, y) corresponding to an error of the detected cabin temperature from the actual cabin temperature, wherein the display control section (S50) represents the estimation accuracy by the width corresponding to the error of the detected cabin temperature from the actual cabin temperature.

In the present invention, when the pre-air-conditioning is being performed, the detected temperature acquisition part periodically acquires the cabin temperature detected by the cabin temperature sensor. At the time when the pre-air-conditioning is started, the cabin temperature detected by the cabin temperature sensor greatly differs from the actual cabin temperature (the atmospheric temperature of an area where a vehicle occupant sits). In view of this, the temperature range estimation part estimates, as the temperature state, a cabin temperature range determined on the basis of the detected cabin temperature such that the cabin temperature range has a width corresponding to an error of the detected cabin temperature from the actual cabin temperature. In this case, the width corresponding to the error of the detected cabin temperature from the actual cabin temperature corresponds to the estimation accuracy. Accordingly, the display control section displays, as the temperature state, the cabin temperature range, which represents the estimation accuracy by its width corresponding to the error, on the screen of the mobile terminal.

The temperature state displayed on the screen of the mobile terminal changes along with a change in the detected cabin temperature. Thus, the vehicle user can properly grasp the state in which the air conditioning of the vehicle cabin progresses by viewing the changing temperature state displayed on the screen of the mobile terminal. Also, since the temperature state is displayed on the screen of the mobile terminal in the form of the cabin temperature range having a width corresponding to the error of the detected cabin temperature from the actual cabin temperature, the temperature state of the vehicle cabin during the pre-air-conditioning can be properly communicated with the vehicle user. By virtue of this control, when the vehicle user gets into the vehicle, the vehicle user is less likely to have an uncomfortable feeling. Furthermore, information regarding the temperature state can be timely provided to the vehicle user. Notably, when the cabin temperature range is displayed, the cabin temperature range may be graphically displayed to be distinguished from other temperature ranges, or the cabin temperature range may be displayed by use of numerical values.

Another feature of the present invention resides in provision of error-corresponding-width changing section (S35 to S41) for narrowing the width corresponding to the error with elapse of time from the start of the pre-air-conditioning.

When the pre-air-conditioning is started, the detected cabin temperature gets closer to the actual cabin temperature due to circulation of air within the vehicle cabin. In view of this, with elapse of time from the start of the pre-air-conditioning, the error-corresponding-width changing section narrows the width which is set for estimation of the cabin temperature range by the temperature range estimation section and which corresponds to the error of the detected cabin temperature from the actual cabin temperature. With this control, the estimated cabin temperature range becomes narrow. Accordingly, the estimation accuracy of the cabin temperature can be displayed on the display screen of the mobile terminal to increase with elapse of time. As a result, not only the temperature state but also the progress of air conditioning within the vehicle cabin can be communicated to the vehicle user more clearly.

Another feature of the present invention resides in that the temperature range estimation part individually sets a plus-side width (positive width) and a minus-side width (negative width) which correspond to the error and which are respectively added to and subtracted from the detected cabin temperature to determine upper and lower boundaries of the cabin temperature range.

The temperature within the vehicle cabin detected by the cabin temperature sensor differs from the actual cabin temperature because of the temperature environment in which the vehicle is placed, the detection position of the cabin temperature sensor, and other factors. In view of this, in the present invention, the temperature range estimation part is configured to individually set a plus-side width and a minus-side width which correspond to the error and which are respectively added to and subtracted from the detected cabin temperature to determine the upper and lower boundaries of the cabin temperature range. Therefore, the cabin temperature range can be set properly.

Another feature of the present invention resides in that the plus-side width corresponding to the error is rendered greater than the minus-side width corresponding to the error.

For example, in the case where the vehicle has been left in a high temperature environment for a long time, the actual cabin temperature is likely to be considerably higher than the detected cabin temperature. In view of this, in the present invention, the plus-side width corresponding to the error is rendered greater than the minus-side width corresponding to the error. Thus, especially for the case where cooling is performed by the air conditioner, the cabin temperature range can be set properly. Notably, in this case, the minus-side width (the error-corresponding width subtracted from the detected cabin temperature) may be zero. Also, in the case where the vehicle is in a low temperature environment, since the difference between the detected cabin temperature and the actual cabin temperature is small, application of the present invention is not necessarily required.

Another feature of the present invention resides in that the temperature state estimation section includes initial estimation accuracy setting part (S34) for setting the estimation accuracy to a lower level when the temperature within the vehicle cabin at the start of the pre-air-conditioning is estimated to be high as compared with the case where the temperature within the vehicle cabin at the start of the pre-air-conditioning is estimated to be low.

In the case where the vehicle is left in a high temperature environment for a long time, the error of the detected cabin temperature from the actual cabin temperature is larger than that in the case where the vehicle is left in a low temperature environment for a long time. In view of this, in the present invention, when the temperature within the vehicle cabin at the start of the pre-air-conditioning is estimated to be high, the initial estimation accuracy setting part sets the estimation accuracy to a lower level as compared with the case where the temperature within the vehicle cabin at the start of the pre-air-conditioning is estimated to be low. By virtue of this control, the estimation accuracy can be set properly. For example, in the case where the cabin temperature detected by the cabin temperature sensor is higher than a reference temperature, the error-corresponding width is set to be wider than that in the case where the detected cabin temperature is lower than the reference temperature. With this operation, the cabin temperature range can be set properly.

Also, the present invention can be applied to a server used in the air-condition remote control system for a vehicle, and its feature resides in that the server includes the above-mentioned temperature state estimation section, and transmits information representing the estimated temperature state to the mobile terminal.

The present invention provides a server which is provided at an information center for handling vehicle information, and is adapted to receive a remote operation instruction from a mobile terminal carried by a vehicle user and transmit, to an onboard communication apparatus of a vehicle identified by the mobile terminal, an instruction for starting an air conditioner of the vehicle before the user gets into the vehicle, to thereby perform pre-air-conditioning of the cabin of the vehicle, the server comprising temperature state estimation section for estimating a temperature state of the cabin; and display control section for transmitting to the mobile terminal information for displaying the temperature state estimated by the temperature state estimation section on the screen of the mobile terminal in a display state which is associated with its estimation accuracy.

Also, the present invention can be applied to a mobile terminal used in the air-condition remote control system for a vehicle, and its feature resides in that the mobile terminal receives information transmitted from the server and representing the temperature state, and displays the temperature state on its screen. Another feature resides in that the mobile terminal includes the above-described temperature state estimation section and the above-described display control section.

The present invention provides a mobile terminal which transmits a remote operation instruction regarding pre-air-conditioning to an onboard communication apparatus of a specific vehicle via a server provided at an information center for handling vehicle information, so as to start an air conditioner of the vehicle before a vehicle user gets into the vehicle, to thereby perform pre-air-conditioning of the cabin of the vehicle, the mobile terminal being comprising temperature state estimation section for estimating a temperature state of the vehicle cabin; and display control section for displaying the temperature state estimated by the temperature state estimation section on the screen of the mobile terminal in a display state which is associated with its estimation accuracy.

Also, the present invention can be applied to a vehicle used in the air-condition remote control system, and its feature resides in that the vehicle includes the above-described temperature state estimation section, and transmits information representing the estimated temperature state to the server.

The present invention provides a vehicle which receives through its onboard communication apparatus a remote operation instruction transmitted from a mobile terminal carried by a vehicle user via a server provided at an information center for handling vehicle information, so as to start an air conditioner of the vehicle before the user gets into the vehicle, to thereby perform pre-air-conditioning of the cabin of the vehicle, the vehicle comprising temperature state estimation section for estimating a temperature state of the cabin; and display control section for transmitting to the server information for displaying the temperature state estimated by the temperature state estimation section on the screen of the mobile terminal in a display state corresponding to its estimation accuracy.

Notably, in the above description, parenthesized reference numerals are provided for facilitating the understanding of the invention, and do not limit the constituent elements of the invention to those of an embodiment which are described through use of the reference numerals.

MODE FOR CARRYING OUT THE INVENTION

Figure 1:
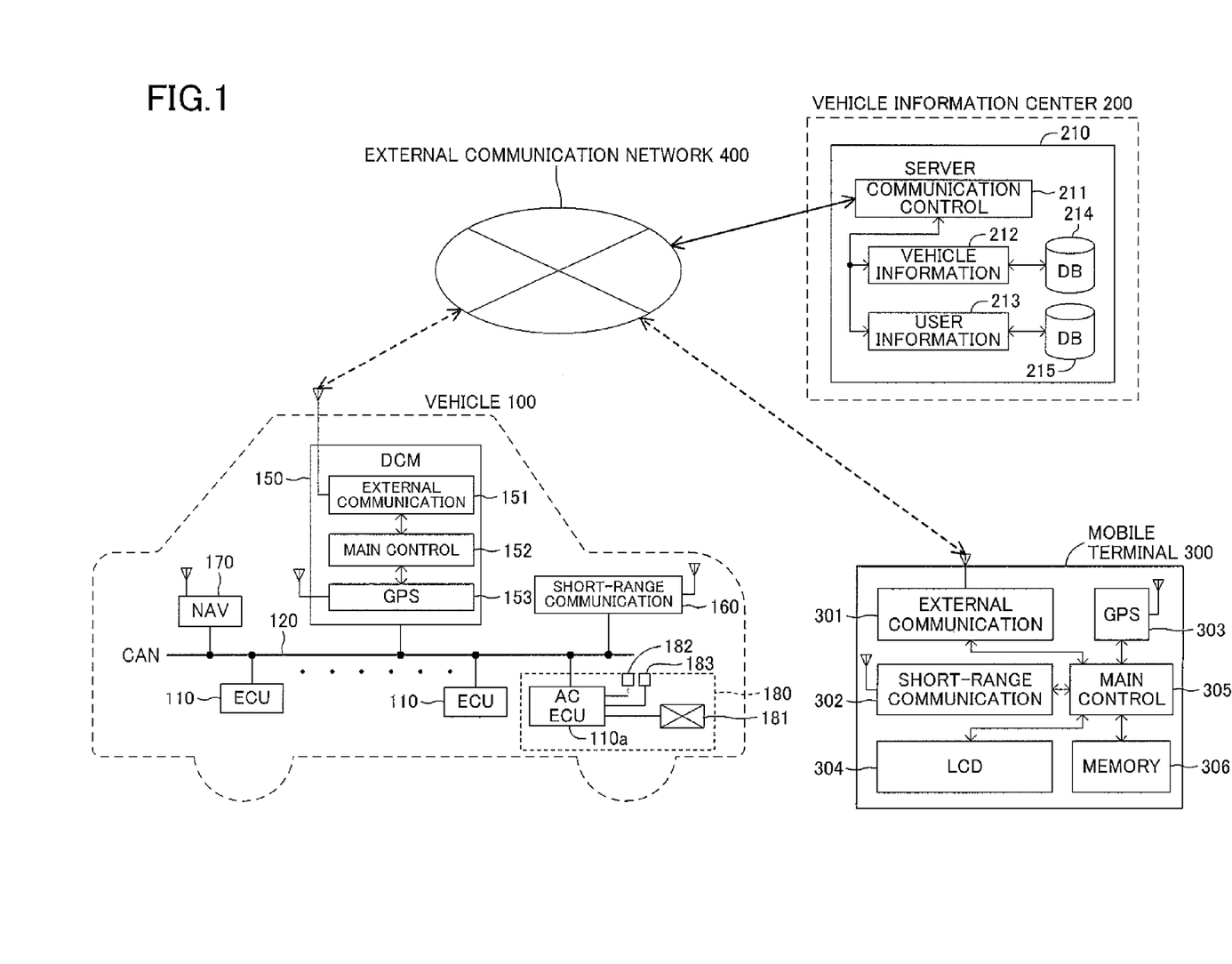
FIG. 1 is a schematic diagram of an information communication system of a vehicle to which an air-condition remote control system according to an embodiment of the present invention is applied.

An air-condition remote control system for a vehicle (hereinafter referred to as a "vehicular air-condition remote control system") according to an embodiment of the present invention will now be described with reference to the drawings. FIG. 1 shows an information communication system for a vehicle (hereinafter referred to as a "vehicular information communication system"). The air-condition remote control system of the present embodiment is applied to this information communication system.

First, the vehicular information communication system will be described. The vehicular information communication system is designed to provide a vehicle user with various services by organically connecting a vehicle 100, a vehicle information center 200, and a mobile terminal 300 owned by the user of the vehicle through an external communication network 400 such as the Internet. The vehicle 100 has a plurality of electronic control units 110 (hereafter called vehicle ECUs 110) for controlling the state of the vehicle. Each vehicle ECU 110 is connected to a CAN communication line 120 of a CAN (Controller Area Network) communication system, and can send and receive various signals through this CAN communication line 120. One of the vehicle ECUs 110 connected to the CAN communication line 120 is an air conditioner ECU 110a for controlling an air conditioner 180 (automatic air conditioner). In the case where the air conditioner ECU 110a is not required to be distinguished from the remaining vehicle ECUs 110, it will also be called the vehicle ECU 110. Each vehicle ECU 110 includes a microcomputer, a memory, an input/output interface, and a drive circuit for driving various actuators using signals input from sensors.

A data communication module 150 (hereafter called a DCM 150) is connected to the CAN communication line 120 so as to communicate with the vehicle information center 200 through the external communication network 400. The DCM 150 includes an external communication control section 151 which sends and receives data to/from the server 210 at the vehicle information center 200 through the external communication network 400; a main control section 152 which sends and receives data to/from the vehicle ECUs 110 through the CAN communication line 120 so as to obtain control information and output instructions to the vehicle ECUs 110; and a GPS unit 153 which detects the coordinates of the current position of the vehicle using the radio waves from GPS satellites. The DCM 150 is mainly composed of a microcomputer, and includes a memory, a radio communication circuit, an input/output interface, etc.

A short-range communication controller 160 is connected to the CAN communication line 120 as a communication interface used for short-range radio communication with a mobile terminal 300. In the present embodiment, the short-range communication controller 160 uses Bluetooth as a communication technology. However, the short-range communication controller 160 may use other short-range radio communication technologies such as Wi-Fi. A navigation apparatus 170 for guiding the vehicle to its destination is connected to the CAN communication line 120. The navigation apparatus 170 includes a vehicle position detection unit that detects the position and heading direction of the vehicle; a memory which stores various pieces of information such as map data; a microcomputer which executes an application program for guiding the vehicle to its destination; a human interface which includes a touch-panel liquid crystal display and a speaker; etc. (the configurations of these components are not shown).

The vehicle information center 200 is a facility for obtaining various pieces of vehicle information from the vehicle 100 and for providing the user of the vehicle with various pieces of service information. The vehicle information center 200 includes a server 210 mainly composed of a microcomputer. The server 210 includes a communication control section 211 which is connected to the external communication network 400 to perform communication control; a vehicle information server 212 which manages information of the vehicle; a user information server 213 which manages information of the vehicle user; a vehicle information storage section 214 which stores a vehicle information database; and a user information storage section 215 which stores a user information database. The server 210 retains relation information for establishing a relation between an ID (information representing the registration number or chassis number of the vehicle) for identifying the vehicle 100 and an ID (the name of the user, the phone number of the mobile terminal 300, the mail address of the user, etc.) for identifying the user of the vehicle. Thus, by specifying one of the two IDs, information which is specified by the other ID can be extracted. The vehicle information server 212 provides not only a function of managing vehicle information but also a function of operating the vehicle 100 remotely.

An example of the mobile terminal 300 owned by the user of the vehicle is a mobile phone (cellular phone) such as a smartphone. The mobile terminal 300 includes an external communication control section 301 which is a communication interface used for connection to the external communication network 400; a short-range communication control section 302 which is a communication interface used to perform short-range radio communication using Bluetooth; a GPS unit 303 which detects the coordinates of the current position of the mobile terminal 300 using the radio waves from GPS satellites; a touch-panel liquid crystal display 304 which functions as a display panel and an operating panel; a main control section 305 which includes a microcomputer for controlling communications and execution of various applications; and a nonvolatile memory 306 which stores application programs and various data. Besides a telephone function, a mail function, a function for connection to the Internet, and a function of executing various application programs, the mobile terminal 300 has a function of sending and receiving various pieces of information to/from the server 210 at the vehicle information center 200.

Preferably, the vehicle 100 to which the vehicular information communication system is applied in the present embodiment is an electric vehicle which includes a traction motor driven by electric power of a battery or a plug-in hybrid vehicle which includes a traction motor, an internal combustion engine, and a battery serving as a power source of the motor and in which the battery is charged by a charger. However, the vehicle 100 may be a conventional vehicle which does not includes a traction motor and which travels through use of power of an internal combustion engine. The vehicle 100 may be of any drive type.

In such a vehicular information communication system, the DCM 150 sends various pieces of information about the vehicle 100 to the server 210 at the vehicle information center 200 along with the vehicle ID (information representing the registration number or chassis number of the vehicle), and the server 210 sends the information necessary for the user of the vehicle to the mobile terminal 300. For example, the DCM 150 obtains, from the CAN communication line 120, information representing the charge state (SOC: State of Charge) of the battery detected by the ECU 110 dedicated for battery charge management, and periodically sends the obtained SOC information to the server 210 at the vehicle information center 200 along with the vehicle ID and vehicle position information. This allows the server 210 at the vehicle information center 200 to know the SOC of the battery of the vehicle 100 as well as the vehicle position. Thus, when the SOC has become poor, the server 210 searches for plug-in stations available within the maximum cruising range of the vehicle 100 using the Internet or the like, sends a message to the mobile terminal 300 of the user of the vehicle to prompt the user of the vehicle to recharge the battery, and sends the search result (a list of available plug-in stations) to the mobile terminal 300 of the user of the vehicle.

The DCM 150 assumes that the period from the moment the ignition switch (or the accessory switch) is turned ON to the moment it is turned OFF is one interval (referred to as one trip interval) and sends operation information such as the distance traveled, traveling time, and power consumption in each trip interval to the server 210 along with the vehicle ID and vehicle position information. The server 210 stores the received operation information and vehicle position information in the vehicle information storage section 214 in such a manner that these pieces of information are related to the vehicle ID. This allows the user of the vehicle to obtain necessary information from the server 210 by starting an appropriate application installed in the mobile terminal 300. For example, when the user of the vehicle starts an application installed in the mobile terminal 300 to request the server 210 to provide information representing electricity consumption and/or fuel consumption, the server 210 creates the information requested by the user of the vehicle on the basis of the operation information stored in the vehicle information storage section 214 and sends it to the mobile terminal 300.

The user of the vehicle can send to the vehicle 100 information, such as the latest map information or facility information downloaded from an Internet site to the mobile terminal 300. In this case, the information downloaded to the mobile terminal 300 is sent from the short-range communication control section 302 to the short-range communication controller 160 of the vehicle 100, and is stored in the memory of the navigation apparatus 170.

In the vehicular information communication system enables the user of the vehicle to send operation instructions from the mobile terminal 300 of the user to the server 210 at the vehicle information center 200, to thereby remotely operate the vehicle 100 via the server 210. One of such remote control functions is pre-air conditioning (pre-AC). "Pre-AC" refers to air-conditioning the cabin of the vehicle by starting the air conditioner 180 before the user of the vehicles gets into the vehicle. In the present embodiment, the user of the vehicle operates the mobile terminal 300 to instruct the air conditioner ECU 110a to start/stop pre-AC. Also, the temperature state of the cabin during pre-AC is displayed on the display 304 of the mobile terminal 300.

The air conditioner 180 for air-conditioning the cabin includes the air conditioner ECU 110a, which is mainly composed of a microcomputer and performs air-conditioning control, an output equipment group 181 which includes a compressor, a fan, an air outlet changeover damper, etc., and sensors such as a cabin temperature sensor 182 which detects the temperature in the cabin and an outside air temperature sensor 183 which detects the outside air temperature. The cabin temperature sensor 182 is installed, for example, inside the instrument panel of the vehicle 100. The outside air temperature sensor 183 is installed, for example, on the front bumper of the vehicle 100.

The air conditioner ECU 110a air-conditions the cabin by controlling operation of the output equipment group 181 on the basis of a temperature set by a vehicle occupant, and the temperatures, etc. detected by sensors such as the outside air temperature sensor 183 and the cabin temperature sensor 182.

Figure 2:
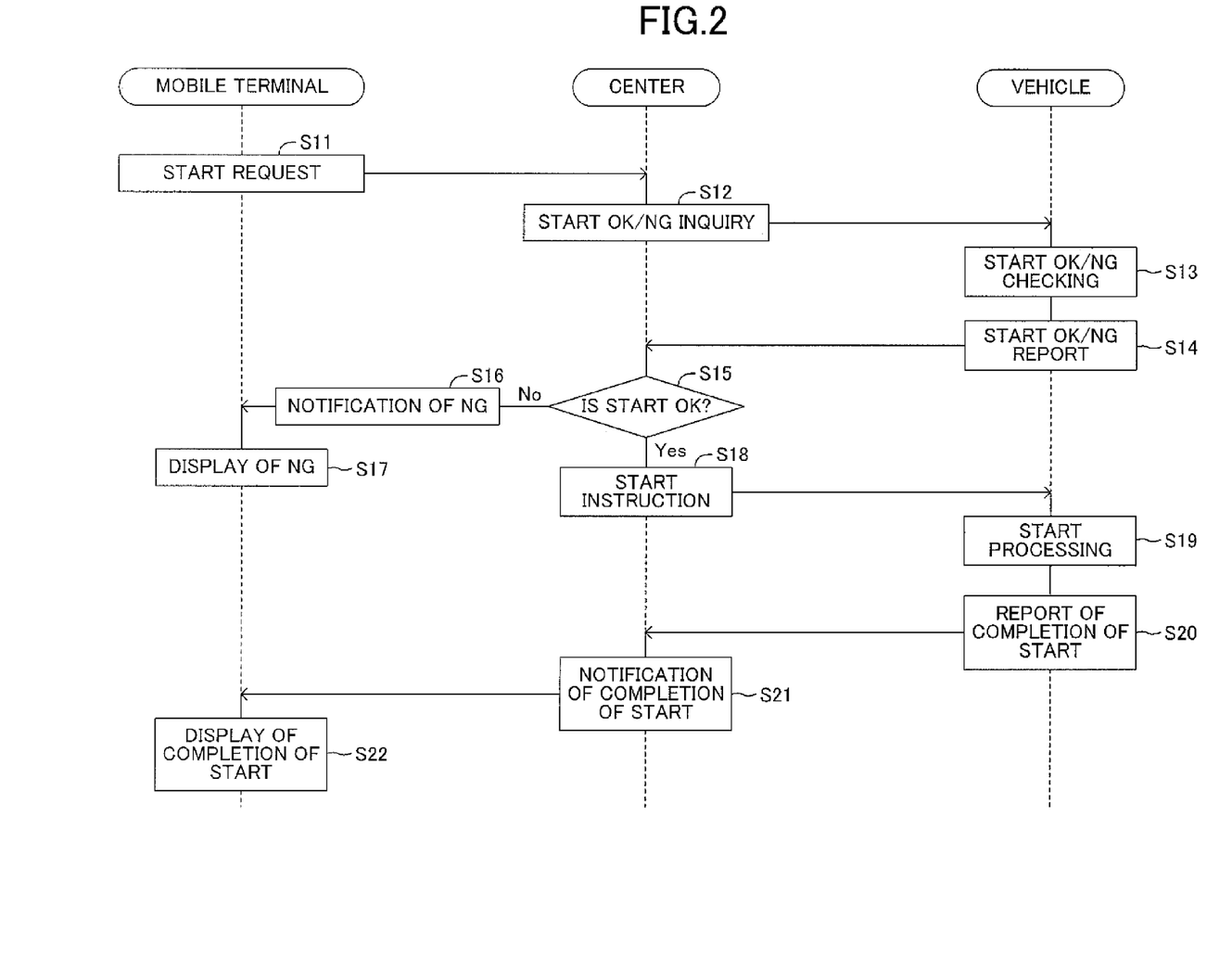
FIG. 2 is a flowchart representing a pre-air-conditioning start control routine.

Next, control performed for pre-AC will be described. FIG. 2 is a flowchart illustrating a pre-AC start control routine. Pre-AC is cooperatively performed by the mobile terminal 300, the server 210 at the vehicle information center 200, and the DCM 150 and ECUs 110 of the vehicle 100.

To start pre-AC, the user of the vehicle first operates the mobile terminal 300 to start an application program for pre-AC. The application program for pre-AC is prestored in the nonvolatile memory 306 of the mobile terminal 300. Hereinafter, the main control section 305 of the mobile terminal 300 which executes the application program for pre-AC will simply be called the mobile terminal 300.

The user of the vehicle touches a Start/Stop button icon displayed on a screen for pre-AC. In response thereto, in step S11, the mobile terminal 300 sends a pre-AC start request to the server 210 at the vehicle information center 200. Note that, when the mobile terminal 300 communicates with the server 210, the mobile terminal 300 sends its mobile terminal ID to the server 210 along with other necessary information. Upon receipt of the pre-AC start request from the mobile terminal 300, in step 12, the server 210 sends a start OK/NG inquiry instruction to the DCM 150 of the vehicle 100 corresponding to the ID of the mobile terminal 300 (hereafter, such a DCM 150 will simply be called the DCM 150). The DCM 150 starts its operation in response to the start OK/NG inquiry instruction received from the server 210. The DCM 150 then starts the CAN communication system, and sends the start OK/NG inquiry instruction to the vehicle ECU 110 which checks vehicle conditions.

Restriction is imposed on pre-AC so that pre-AC is performed only when predetermined conditions are satisfied. Examples of such conditions include: all the doors and trunk lid of the vehicle being closed; all the doors of the vehicle being locked; and the ignition switch and the accessory switch being in the OFF state. The vehicle ECU 110 checks the vehicle conditions in step S13 and sends the check result to the DCM 150. In step S14, the DCM 150 sends a start OK/NG report to the server 210.

In step S15, the server 210 determines whether or not start of pre-AC has been permitted on the basis of the received start OK/NG report. If it has not been permitted, the server 210 sends a start NG notification to the mobile terminal 300 in step 16. Upon receipt of the start NG notification, in step S17, the mobile terminal 300 displays a message indicating that pre-AC cannot be started on its display screen.

If start of pre-AC has been permitted (S15: Yes), in step S18, the server 210 sends a pre-AC start instruction to the DCM 150. Upon receipt of the pre-AC start instruction, in step S18, the DCM 150 sends a pre-AC start instruction to the air conditioner ECU 110a. In response thereto, in step S19, the air conditioner ECU 110a performs pre-AC start processing and sends a start completion report to the DCM 150. In response thereto, in step S20, the DCM 150 sends s start completion report to the server 210 at the vehicle information center 200.

Upon receipt of the start completion report, in step S21, the server 210 sends a start completion notification to the mobile terminal 300. Upon receipt of the start completion notification, in step S22, the mobile terminal 300 displays on its display screen a message indicating that pre-AC has started.

Thus, start of pre-AC is completed. The duration of pre-AC is limited to a predetermined length of time (for example, 10 minutes). This is necessary to restrict power consumption of the onboard battery. Therefore, pre-AC automatically stops after lapse of the predetermined time even if the user of the vehicle does not operate the mobile terminal 300 to stop pre-AC. If the user of the vehicle wants to stop pre-AC before elapse of the preset time, the user of the vehicle touches the Start/Stop button icon 304a (see FIG. 7) on a pre-AC application screen displayed on the mobile terminal 300. In this case, a stop request is sent from the mobile terminal 300 to the DCM 150 through the server 210 at the vehicle information center 200, and then a pre-AC stop instruction is sent from the DCM 150 to the air conditioner ECU 110a. Thus, pre-AC stops.

Figure 3:
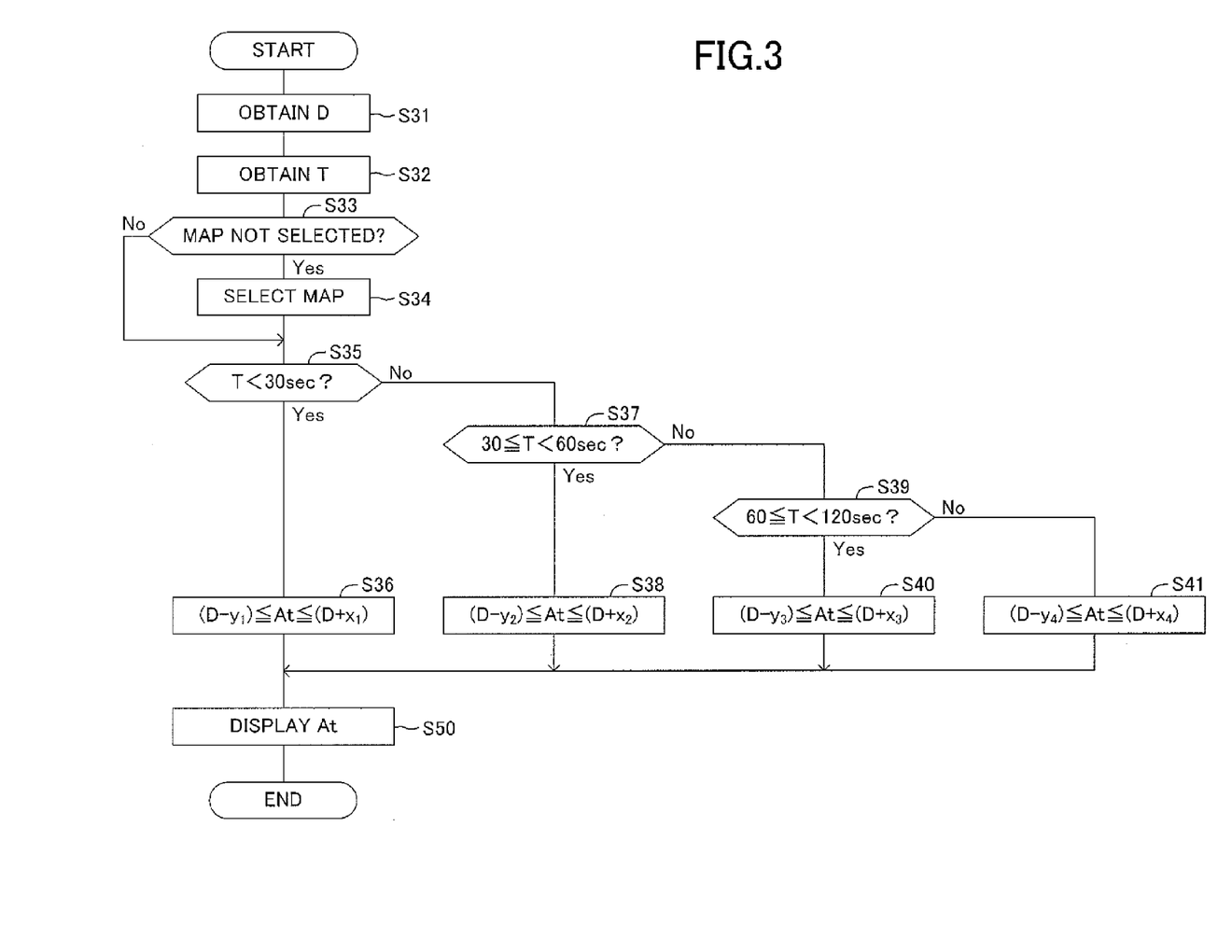
FIG. 3 is a flowchart representing a pre-air-conditioning-temperature display control routine.

After pre-AC has started, the display screen of the mobile terminal 300 is switched to a cabin temperature state screen. Hereinafter, there will be described processing of displaying the cabin temperature during pre-AC on the display 304 of the mobile terminal 300. FIG. 3 shows a pre-AC-temperature display control routine which is executed by the main control section 305 of the mobile terminal 300. The pre-AC-temperature display control routine of the present embodiment starts after display of the message indicating that pre-AC has been started by the above-mentioned application for pre-AC.

In parallel with execution of the pre-AC-temperature display control routine, the DCM 150 obtains information representing the temperature D detected by the cabin temperature sensor 182 and information representing the time T elapsed since start of pre-AC from the air conditioner ECU 110a at predetermined intervals, and sends them to the server 210. Each time the server 210 receives the information representing the detected temperature D and the information representing the time T elapsed since start of pre-AC, it sends them to the mobile terminal 300 of the user of the vehicle 100.

The pre-AC-temperature display control routine is executed repeatedly at predetermined intervals. When the pre-AC-temperature display control routine starts, in step S31, the main control section 305 of the mobile terminal 300 obtains the detected temperature D received from the server 210. In step S32, the main control section 305 obtains the elapsed time T received from the server 210. In step 33, the main control section 305 determines whether or not a temperature width setting map has already been selected. Hereinafter, the temperature width setting map will be described.

At the beginning of pre-AC, the temperature D detected by the cabin temperature sensor 182 is considerably different from the actual cabin temperature (the ambient temperature in the area where the vehicle occupant is seated). In the present embodiment, a temperature range is estimated as the temperature state of the cabin. The temperature range includes a plus-side width and a minus-side width. The plus-side width corresponds to a positive error of the detected temperature D, and represents temperature range between the detected temperature D and upper limit temperature. The minus-side width corresponds to a negative error of the detected temperature, and represents temperature range between the detected temperature D and lower limit temperature. In this case, a temperature width x which corresponds to the error and is provided on the plus-side of the detected temperature D (hereinafter called the plus-side temperature width x) and a temperature width y which corresponds to the error and is provided on the minus-side of the detected temperature D (hereafter called the minus-side temperature width y) are set separately. For example, if the detected temperature D is 25° C., the plus-side temperature width x is 10° C., the minus-side temperature width y is 5° C., the estimated temperature range At displayed as the temperature state is from 20° C. to 35° C. The temperature width setting map provides the plus-side temperature width X and the minus-side temperature width y.

Figure 4:
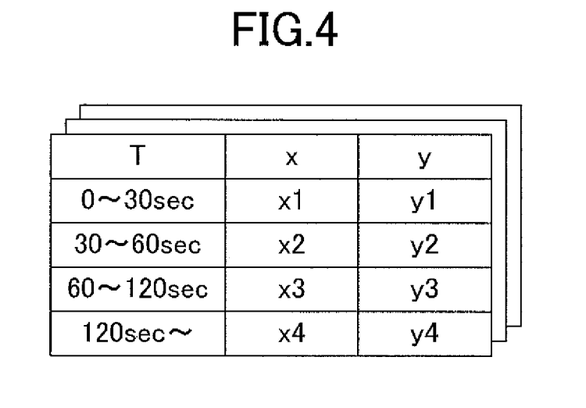
FIG. 4 is a temperature width setting map.

After start of pre-AC, the detected temperature D approaches the actual cabin temperature due to circulation of air within the cabin. Therefore, the temperature width setting map is created, for example, so that, as shown in FIG. 4, the plus-side temperature width x can be switched among four values (x1, x2, x3, and x4) and the minus-side temperature width y can be switched among four values (y1, y2, y3, and y4) according to the time T elapsed after the start of pre-AC.

The optimum plus-side temperature width x and the optimum minus-side temperature width y vary depending on the temperature at the time when the pre-AC operation is started. For example, in the case where the vehicle 100 has been left in a high-temperature environment for a long period of time, the actual cabin temperature is liable to become considerably higher than the detected temperature D. On the other hand, in the case where the vehicle 100 has been left in a low-temperature environment for a long period of time, the difference between the actual cabin temperature and the detected temperature D is smaller than that in the case where the vehicle 100 has been left in the high-temperature environment, and the actual cabin temperature is slightly lower than the detected temperature D. This requires a plurality of temperature width setting maps corresponding to the temperature states at the start of pre-AC. These temperature width setting maps are embedded in the application program installed in the mobile terminal 300.

Returning back to the description of the pre-AC-temperature display control routine, no temperature width setting map is selected immediately after the pre-AC-temperature display control routine starts. In view of this, in step S34, the main control section 305 of the mobile terminal 300 selects a temperature width setting map on the basis of the detected temperature D. There are provided a plurality of temperature width setting maps corresponding to a plurality of possible values of the detected temperature D at the start of pre-AC. The temperature state at the start of pre-AC can be estimated from the detected temperature D at the start of pre-AC. Therefore, in the present embodiment, the main control section 305 of the mobile terminal 300 selects a temperature width setting map in such a manner that the higher the value of the temperature D detected at the start of pre-AC, the greater the value of the plus-side temperature width x of the selected map.

Figure 5:
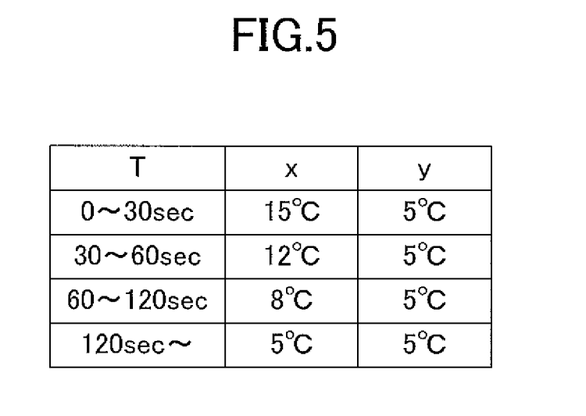
FIG. 5 is a temperature width setting map used at the time of cooling.

FIG. 5 shows a temperature width setting map which is to be selected when the detected temperature D at the start of pre-AC is high and in which the plus-side temperature width x is set to a large value. When the detected temperature D at the start of pre-AC is low, the difference between the detected temperature D and the actual cabin temperature is small. Therefore, the main control section 305 of the mobile terminal 300 selects a temperature width setting map in which the plus-side temperature width x is as small as the minus-side temperature width y (for example, both the plus-side temperature width x and the minus-side temperature width y are 5° C.). For example, when there are provided two temperature width setting maps (one for cooling and the other for heating), the main control section 305 of the mobile terminal 300 selects the temperature width setting map for cooling if the detected temperature D at the start of pre-AC is higher than a reference temperature, and selects the temperature width setting map for heating if the detected temperature D at the start of pre-AC is equal to or lower than the reference temperature. In addition, the plus-side temperature width x in the temperature width setting map for cooling is set to a value greater than that of the plus-side temperature width x in the temperature width setting map for heating.

After selecting a temperature width setting map in step S34, the main control section 305 of the mobile terminal 300 determines in the subsequent step S35 whether or not the elapsed time T is shorter than 30 seconds. Since the main control section 305 makes a "Yes" determination immediately after the start of pre-AC, in the subsequent step S36, the main control section 305 sets the estimated temperature range At to a range expressed by (D−y1)≤At≤(D+x1). That is, the temperature range between the value obtained by subtracting the minus-side temperature width y1 from the detected temperature D and the value obtained by adding the plus-side temperature width x1 to the detected temperature D is set as the estimated temperature range At. Accordingly, the temperature width of the estimated temperature range At is expressed by (y1+x1). This temperature width represents the accuracy in estimating the temperature state. In other words, the temperature width represents the degree of uncertainty of the temperature state and consequently the greater the width, the lower the estimation accuracy.

Figure 7:
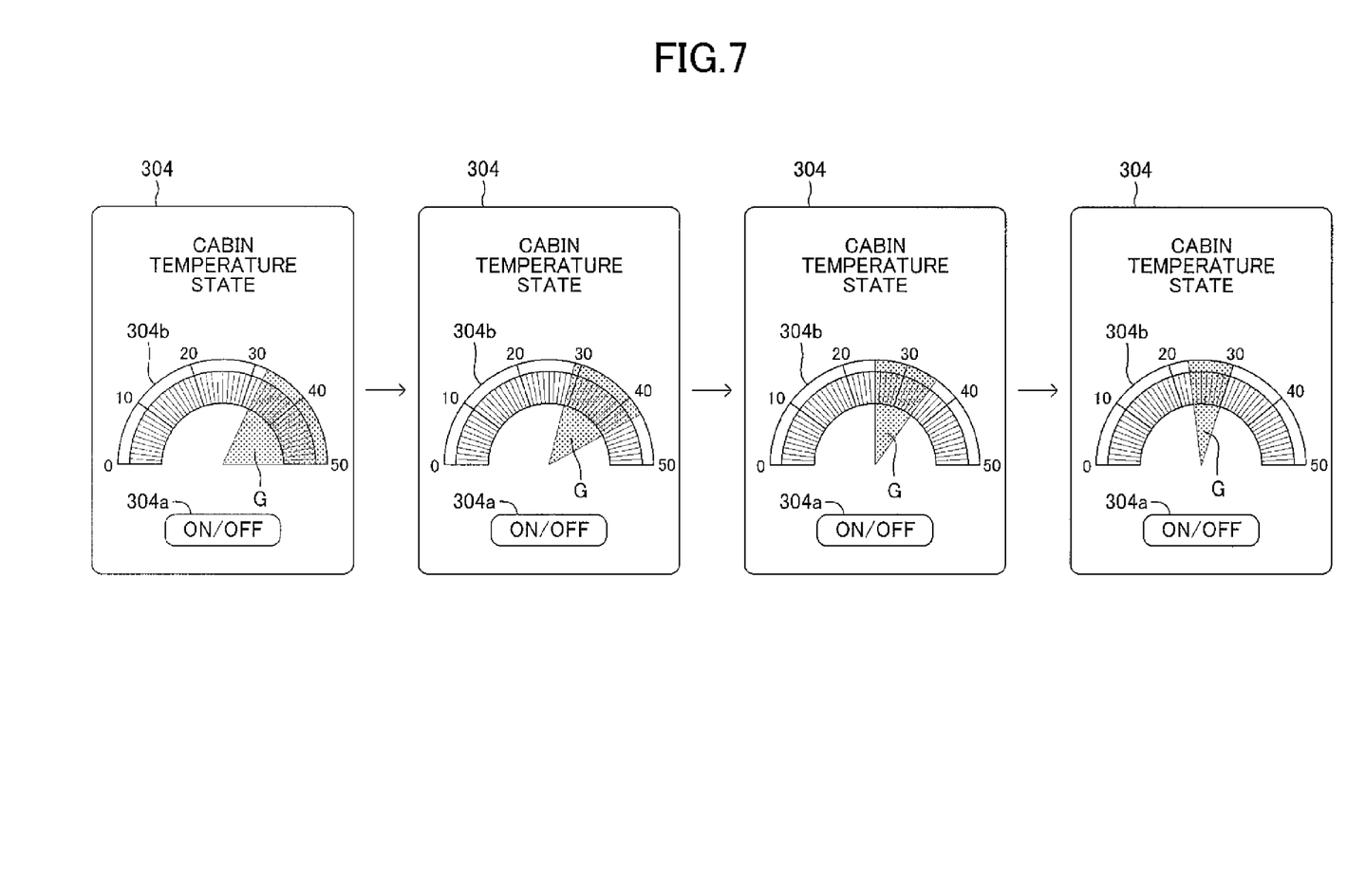
FIG. 7 is a set of views showing the display screen of a mobile terminal.

In the subsequent step S50, the main control section 305 of the mobile terminal 300 displays the estimated temperature range At on the display 304. FIG. 7 shows the display screens of the mobile terminal 300 to indicate how the display state changes with time. In this example, a temperature display meter 304b with a semicircular temperature scale is displayed on the display 304. The shape of the temperature scale may be determined freely. For example, it may be linear (vertical, horizontal, oblique, etc.), circular, or oval. The main control section 305 of the mobile terminal 300 displays a region G (hereafter called the estimated temperature display region G) representing the estimated temperature range At in the temperature scale in such a manner that it is distinguished from the remaining temperature region. For example, the estimated temperature display region G may be displayed at a brightness different from that of the remaining temperature region. In this case, a portion of the temperature scale corresponding to the estimated temperature display region G may be highlighted, and the remaining portion of the temperature scale (corresponding to the remaining temperature region) is rendered darker. Alternatively, the color of the estimated temperature display region G may be rendered different from that of the remaining temperature region. Alternatively, a portion of the temperature scale corresponding to the estimated temperature display region G may be displayed solid.

As mentioned previously, in the case where the detected temperature D at the start of pre-AC is very high, the difference between the detected temperature D and the actual cabin temperature is very large. That is, the actual cabin temperature is considerably higher than the detected temperature D. Therefore, if the detected temperature D is displayed on the mobile terminal 300 as it is during pre-AC performed for cooling, the displayed temperature becomes far lower than the actual cabin temperature. Hence, in the present embodiment, the estimated temperature range At is used to display the temperature state. Accordingly, the present embodiment is especially effective in the case where the detected temperature D is high and the temperature in the cabin is estimated to be high (pre-AC is performed for cooling). Hereinafter, the present embodiment will be described for the case where pre-AC is performed for cooling.

When pre-AC is performed for cooling, the plus-side temperature width x1 at the start of pre-AC is set to a large value. For example, if the detected temperature D at the start of pre-AC is higher than a predetermined reference temperature, the main control section 305 of the mobile terminal 300 selects the temperature width setting map shown in FIG. 5 in which the plus-side temperature width x is set to a large value. In this example, at the time when the pre-AC operation is started, the estimated temperature range At has the maximum width of 20° C.

After displaying the estimated temperature display region G representing the estimated temperature range At on the display 304 in step S50, the main control section 305 of the mobile terminal 300 terminates this routine temporarily, and then executes this routine repeatedly at predetermined intervals. Before restarting this routine, the main control section 305 of the mobile terminal 300 retains the display state of the display 304. After restarting this routine at the predetermined timing, the main control section 305 obtains the detected temperature D and the elapsed time T which are received from the server 210 as mentioned previously (S31 and S32). In this case, the result of the determination in step S33 becomes "No" and the main control section 305 skips the map selection processing because a temperature width setting map has already been selected. If the elapsed time T is shorter than 30 seconds, as described previously, the main control section 305 computes the estimated temperature range At expressed by $(D-y1) \leq At \leq (D+x1)$, and displays on the display 304 the estimated temperature display region G corresponding to the estimated temperature range At.

The main control section 305 of the mobile terminal 300 repeats the above-mentioned steps. When the elapsed time T becomes 30 seconds or longer, the result of the determination in step S35 becomes "No" and the main control section 305 proceeds to Step 37. In step S37, the main control section 305 of the mobile terminal 300 determines whether or not the elapsed time T is not shorter than 30 seconds but shorter than 60 seconds. If the elapsed time T is not shorter than 30 seconds but shorter than 60 seconds, in step S38, the main control section 305 sets the estimated temperature range At to the range expressed by $(D-y2) \leq At \leq (D+x2)$ through use of the plus-side temperature width x2 and minus-side temperature width y2 obtained from the temperature width setting map.

After pre-AC is started for cooling, the detected temperature D approaches the actual cabin temperature because of circulation of air within the cabin. Therefore, the temperature width setting map is prepared such that the plus-side temperature width x decreases as the elapsed time T increases. In the present embodiment, the main control section 305 does not changes the minus-side temperature width y2 irrespective of the elapsed time T, because the minus-side temperature width y2 is small from the beginning.

The main control section 305 of the mobile terminal 300 displays on the display 304 the estimated temperature display region G, which represents the estimated temperature range At set in step S38. In this case, as shown in FIG. 7(b), the width of the estimated temperature display region G (namely, the width of the estimated temperature range At) displayed on the display 304 becomes narrower than that displayed at the start of pre-AC. As a result of repeated execution of the above-mentioned steps, the estimated temperature display region G displayed on the display 304 moves with the detected temperature D. Thus, the user of the vehicle can know that the width of the estimated temperature display region G has become narrower and the estimated temperature display region G moves.

After having determined that the elapsed time T has exceeded 60 seconds in step S37, the main control section 305 of the mobile terminal 300 proceeds to step S39 so as to determine whether or not the elapsed time T is not shorter than 60 seconds but shorter than 120 seconds. If the elapsed time T is not shorter than 60 seconds but shorter than 120 seconds, in step S40, the main control section 305 of the mobile terminal 300 sets the estimated temperature range At to the range expressed by $(D-y3) \leq At \leq (D+x3)$ through use of the plus-side temperature width x3 and minus-side temperature width y3 obtained from the temperature width setting map, and displays the estimated temperature display region G representing the set estimated temperature range At on the display 304 (S50). In this case, the plus-side temperature width x3 is smaller than the plus-side temperature width x2. Hence, as shown in FIG. 7(C), the width of the estimated temperature display region G decreases further.

If the elapsed time T reaches 120 seconds after repetitive execution of the above-mentioned steps, in step S41, the main control section 305 of the mobile terminal 300 sets the estimated temperature range At to the range expressed by $(D-y4) \leq At \leq (D+x4)$ through use of the plus-side temperature width x4 and the minus-side temperature width y4 obtained from the temperature width setting map, and displays the estimated temperature display region G representing the set estimated temperature range At on the display 304 (S50). In this case, the plus-side temperature width x4 is smaller than the plus-side temperature width x3. Hence, as shown in FIG. 7(d), the width of the estimated temperature display region G decreases further.

The main control section 305 of the mobile terminal 300 repeatedly executes the pre-AC-temperature display control routine until the time limit set for pre-AC is reached or the Start/Stop button icon 304a on the display screen is touched. When pre-AC is completed, the main control section 305 of the mobile terminal 300 displays on the display 304 a message indicating that pre-AC is completed, and then terminates the application for pre-AC.

Figure 6:
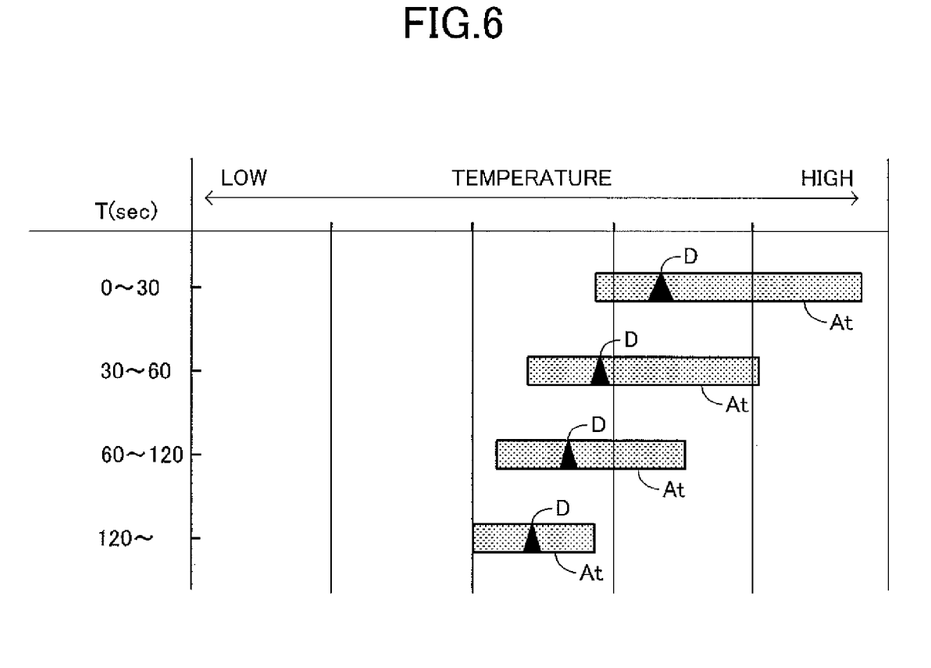
FIG. 6 is a graph showing changes in detected temperature and estimated temperature range.

FIG. 6 shows changes in the detected temperature D and the estimated temperature range At in the case where pre-AC is performed for cooling. Since a large plus-side temperature width x is set at the beginning of pre-AC, the estimated temperature range At is wide accordingly. After the start of pre-AC, the actual cabin temperature falls gradually. During this period, the detected temperature D approaches the actual cabin temperature due to circulation of air within the cabin. Therefore, the plus-side temperature width x can be decreased in accordance with the time elapsed after the start of pre-AC. Thus, the display of the temperature state of the cabin can be switched from a low accuracy state (vague state) to a high accuracy state.

The above-mentioned vehicular air-condition remote control system of the present embodiment sets the estimated temperature range At on the basis of the detected temperature D and the elapsed time T, and displays the estimated temperature display region G representing the estimated temperature range At on the display 304 of the mobile terminal 300 as the temperature state of the cabin. Therefore, even at the beginning of pre-AC at which detection of the actual cabin temperature is difficult, the gap between the temperature state displayed on the mobile terminal 300 and the temperature sensed by the user of the vehicle can be reduced by displaying the temperature state of the cabin through use of the estimated temperature range At. This prevents the user of the vehicle from having an uncomfortable feeling when the user of the vehicle gets into the vehicle. In addition, it is possible to timely provide the user of the vehicle with the information representing the pre-AC temperature without having the user of the vehicle waiting long after start of pre-AC. Therefore, the present embodiment can properly inform the user of the vehicle of the temperature state of the cabin during pre-AC.

Furthermore, when the detected temperature D at the start of pre-AC is high, the width of the estimated temperature range At is increased because the difference or error between the detected temperature D and the actual cabin temperature is larger than that in case where the detected temperature D is low. Especially in this case, the plus-side temperature width x is made larger than the minus-side temperature width y. Therefore, even when pre-AC (for cooling) is started in a situation where the vehicle is placed in a high-temperature environment, the actual cabin temperature falls in the estimated temperature range At. In addition, since the temperature width setting map allows the plus-side temperature width x and the minus-side temperature width y to be set separately, appropriate temperature widths can be set in accordance with the mode of detection of the cabin temperature.

Once pre-AC starts, the width of the estimated temperature range At is decreased with elapse of time after the start of pre-AC. Consequently, the estimated temperature display region G displayed on the display 304 of the mobile terminal 300 not only moves with the change in the detected temperature D but also decreases gradually in width. This allows the user of the vehicle to know that the accuracy of cabin temperature estimation is increasing with time. In addition, since the estimated temperature display region G changes greatly, the progress of pre-AC of the cabin can be appropriately communicated to the user of the vehicle.

The vehicular air-condition remote control system according to the present embodiment has been described above. However, the present invention is not limited to the above-described embodiment, and may be modified in various manners without departing from the scope of the present invention.

For example, the present embodiment is configured such that the main control section 305 of the mobile terminal 300 executes the pre-AC-temperature display control routine. However, the present embodiment may be configured such that the server 210 (vehicle information server 212) at the vehicle information center 200 executes the pre-AC-temperature display control routine. In this case, each time the server 210 receives information representing the detected temperature D and the time T elapsed after the start of pre-AC from the DCM 150 of the vehicle 100, the server 210 computes the estimated temperature range At in steps S33 to S41 and sends information representing the estimated temperature range At to the mobile terminal 300 in order to display the estimated temperature range At (estimated temperature display region G) on the display 304 of the mobile terminal 300.

Alternatively, the present embodiment may be configured such that the DCM 150 (main control section 152) of the vehicle 100 executes the pre-AC-temperature display control routine. In this case, each time the DCM 150 receives information representing the detected temperature D and the time T elapsed after the start of pre-AC from the air conditioner ECU 110a, the DCM 150 computes the estimated temperature range At in steps S33 to S41, and sends information representing the estimated temperature range At to the server 210. Meanwhile, the server 210 sends information representing the estimated temperature range At received from the DCM 150 to the mobile terminal 300 in order to display the estimated temperature range At (estimated temperature display region G) on the display 304 of the mobile terminal 300.

Alternatively, the present embodiment may be configured such that the air conditioner ECU 110a of the vehicle 100 executes the pre-AC-temperature display control routine. In this case, the air conditioner ECU 110a computes the estimated temperature range At in steps S33 to S41 on the basis of the temperature D detected by the cabin temperature sensor 182 and the time T elapsed after the start of pre-AC, and sends information representing the estimated temperature range At to the DCM 150. Meanwhile, the DCM 150 sends information representing the estimated temperature range At to the mobile terminal 300 through the server 210 in order to display the estimated temperature range At (estimated temperature display region G) on the display 304 of the mobile terminal 300.

In the present embodiment, an estimated temperature display region G representing the estimated temperature range At is graphically displayed in a temperature scale displayed on the display 304 of the mobile terminal 300. However, the estimated temperature range At need not necessarily be displayed using the temperature scale. For example, the estimated temperature range At may be displayed using numerical values, for example, "25° C. to 35° C." In this case, if the estimated temperature range At is an extremely high temperature range, its lower boundary may be displayed using the minimum value (D−y) of the estimated temperature range At, for example, "40° C. or higher." If the estimated temperature ranges At is an extremely low temperature range, its upper boundary may be displayed using the maximum value (D+x) of the estimated temperature range At, for example, "5° C. or lower."

In the present embodiment, a temperature width setting map is selected from among a plurality of temperature width setting maps on the basis of the detected temperature D at the start of pre-AC. However, there may be provided only one temperature width setting map dedicated to cooling. That is, control may be performed in such a manner that the width of the estimated temperature range At is switched only when the detected temperature D at the start of pre-AC is higher than the reference temperature.

The present embodiment is configured such that the plus-side temperature width x and the minus-side temperature width y are set separately. However, the present embodiment may be configured such that only the plus-side temperature width x is switched. Alternatively, the present embodiment may be configured such that the minus-side temperature width y is set to zero when pre-AC is performed for cooling. Alternatively, the present embodiment may be configured such that the plus-side temperature width x is set to zero when pre-AC is performed for heating.

The values used as the plus-side temperature widths x and the minus-side temperature widths y may be set freely. Note that the values in FIG. 5 are given just as an example. In the present embodiment, the time period after the start of pre-AC is divided into four sections, and a certain width of estimated temperature range At is set for each of these sections. However, these sections of the time period after the start of pre-AC may be set freely.

Pre-AC may be performed for cooling only.

The invention claimed is:

1. An air-conditioner remote control system for a vehicle which transmits a remote operation instruction from a mobile terminal carried by a vehicle user to an onboard communication apparatus of a vehicle identified by the mobile terminal via a server provided at an information center which handles vehicle information, whereby an air conditioner of the vehicle is started before the user gets into the vehicle so as to perform pre-air-conditioning of the cabin of the vehicle, comprising:
 a temperature state estimation section which estimates a temperature state of the cabin as a temperature range; and
 a display control section which displays the temperature state estimated by the temperature state estimation section as the temperature range on a screen of the mobile terminal in a display state in which the temperature range represents an estimation accuracy of the temperature state.

2. An air-conditioner remote control system for a vehicle according to claim 1, further comprising an estimation accuracy display changing section which changes the display state of the mobile terminal such that the estimation accuracy of the temperature state represented by the temperature range increases with elapse of time after the start of the pre-air-conditioning.

3. An air-conditioner remote control system for a vehicle according to claim 1, wherein the temperature state estimation section includes:
 a detected temperature acquisition part which periodically acquires the cabin temperature detected by a cabin temperature sensor; and
 a temperature range estimation part which estimates, as the temperature state, a cabin temperature range determined on the basis of the cabin temperature acquired by the detected temperature acquisition part such that the cabin temperature range has a width corresponding to an error of the detected cabin temperature from the actual cabin temperature, wherein the display control section displays the estimation accuracy represented by the width corresponding to the error of the detected cabin temperature from the actual cabin temperature.

4. An air-conditioner remote control system for a vehicle according to claim 3, wherein the estimation accuracy display changing section is an error-corresponding-width changing section which narrows the width corresponding to the error with elapse of time from the start of the pre-air-conditioning.

5. An air-conditioner remote control system for a vehicle according to claim 3, wherein the temperature range estimation part individually sets a plus-side width and a minus-side width which correspond to the error and which are respectively added to and subtracted from the detected cabin temperature to determine upper and lower boundaries of the cabin temperature range.

6. An air-conditioner remote control system for a vehicle according to claim 5, wherein the plus-side width corresponding to the error is rendered greater than the minus-side width corresponding to the error.

7. An air-conditioner remote control system for a vehicle according to claim 1, wherein the temperature state estimation section includes an initial estimation accuracy setting part which sets the estimation accuracy to a lower level when the temperature within the vehicle cabin at the start of the pre-air-conditioning is estimated to be high as compared with the case where the temperature within the vehicle cabin at the start of the pre-air-conditioning is estimated to be low.

8. A server used in an air-conditioner remote control system for a vehicle according to claim 1, wherein the server includes the temperature state estimation section, and transmits information representing the estimated temperature state to the mobile terminal.

9. A mobile terminal used in an air-conditioner remote control system for a vehicle according to claim 1, wherein the mobile terminal receives information transmitted from the server and representing the temperature state, and displays the temperature state on its screen.

10. A server which is provided at an information center for handling vehicle information, and is adapted to receive a remote operation instruction from a mobile terminal carried by a vehicle user and transmit, to an onboard communication apparatus of a vehicle identified by the mobile terminal, an instruction for starting an air conditioner of the vehicle before the user gets into the vehicle, to thereby perform pre-air-conditioning of the cabin of the vehicle, comprising:
 a temperature state estimation section which estimates a temperature state of the cabin as a temperature range; and wherein
 the server transmits to the mobile terminal information for displaying the temperature state estimated by the temperature state estimation section as the temperature range on the screen of the mobile terminal in a display state in which the temperature range represents an estimation accuracy of the temperature state.

* * * * *